United States Patent
Foster, Sr.

(10) Patent No.: US 7,545,617 B2
(45) Date of Patent: *Jun. 9, 2009

(54) SLAVE MODE THERMAL CONTROL WITH THROTTLING AND SHUTDOWN

(75) Inventor: Jimmy Grant Foster, Sr., Morrisville, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 12/032,443

(22) Filed: Feb. 15, 2008

(65) Prior Publication Data

US 2008/0137247 A1    Jun. 12, 2008

Related U.S. Application Data

(63) Continuation of application No. 11/137,157, filed on May 25, 2005, now Pat. No. 7,394,636.

(51) Int. Cl.
*H02H 5/00* (2006.01)
(52) U.S. Cl. ..................................... 361/103
(58) Field of Classification Search .................. 361/103
See application file for complete search history.

(56) References Cited

U.S. PATENT DOCUMENTS

| | | | |
|---|---|---|---|
| 3,745,925 A | 7/1973 | Hester, Jr. | |
| 5,559,675 A | 9/1996 | Hsieh et al. | |
| 5,627,714 A | 5/1997 | Baurand et al. | |
| 5,978,864 A | 11/1999 | Hetherington et al. | |
| 6,020,820 A | 2/2000 | Chiang | |
| 6,181,555 B1 | 1/2001 | Haley et al. | |
| 6,412,074 B1 | 6/2002 | Flannery | |
| 6,469,368 B2 | 10/2002 | Galster | |
| 6,496,118 B1 | 12/2002 | Smith | |
| 6,500,024 B2 | 12/2002 | Hsu | |
| 6,701,272 B2 | 3/2004 | Cooper et al. | |

FOREIGN PATENT DOCUMENTS

JP    2214150 A    8/1990

OTHER PUBLICATIONS

J.H.Hong, "Thermal Printer Chip Protection Circuit," IBM Technical Disclosure Bulletin, Oct. 1973, pp. 1422-1423, vol. 16, No. 5.
P.R.Epley et al., "Semiconductor Thermal Overload Protector," IBM Technical Disclosure Bulletin, Oct. 1973, p. 1598, vol. 16, No. 5.

*Primary Examiner*—Stephen W Jackson
(74) *Attorney, Agent, or Firm*—Dillon & Yudell LLP

(57) ABSTRACT

Within a group of components in a circuit, each component in the group has a thermal detector that describes whether that component is operating at a temperature that is normal, high or fatal. A first signal representing a first component's temperature is sent downstream to a second component in the group. If the second component is operating at the first component's temperature or lower, then the first signal is passed on downstream from the second component. However, if the second component is at a higher temperature, then the second component generates a second signal that represents the second component's temperature, and sends that second signal downstream. A signal representing the highest temperature detected in the group eventually reaches a master controller that, depending on the signal received from the group, lets the group continue to operate normally, throttles the group down, or else shuts the group down.

3 Claims, 10 Drawing Sheets

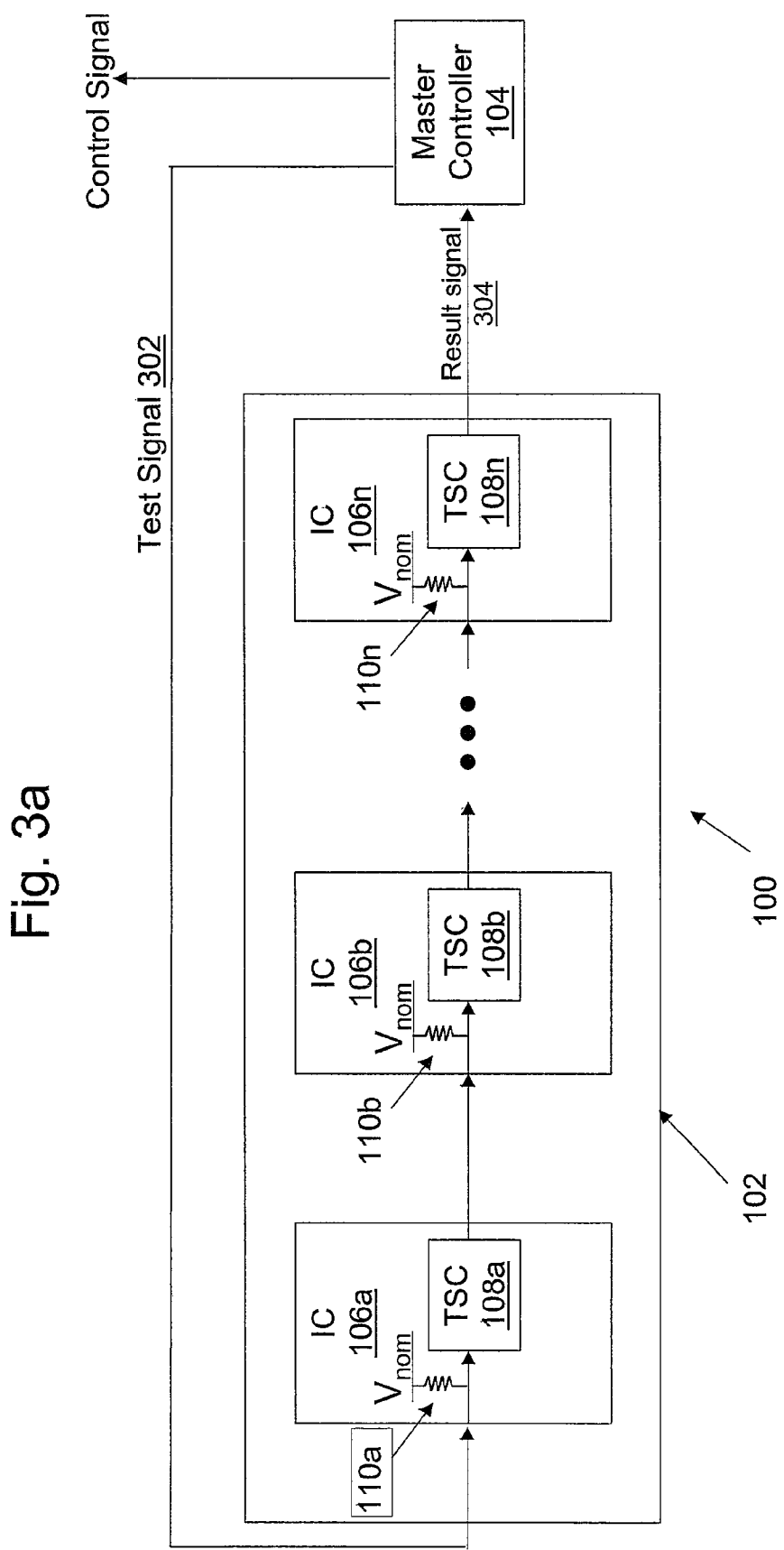

FIG. 4a

| Input-3S | Fatal | Hot-N | Output |
|---|---|---|---|
| L | L | L | L |
| L | L | H | L |
| L | H | L | H |
| L | H | H | H |
| R | L | L | L |
| R | L | H | R |
| R | H | L | H |
| R | H | H | H |
| H | L | L | H |
| H | L | H | H |
| H | H | L | H |
| H | H | H | H |

402

| | |
|---|---|
| Input-3S | 3 states - high is fatal, low is hot, reference is normal |
| Fatal | active high |
| Hot-N | active low |
| | |
| L | HOT         low |
| R | NOMINAL   reference |
| H | FATAL       high |

404

| Input3 | Input2 | Input1 | Output |
|--------|--------|--------|--------|
| L | L | L | L |
| L | L | R | L |
| L | L | H | H |
| L | R | L | L |
| L | R | R | L |
| L | R | H | H |
| L | H | L | H |
| L | H | R | H |
| L | H | H | H |
| R | L | L | L |
| R | L | R | L |
| R | L | H | H |
| R | R | L | L |
| R | R | R | R |
| R | R | H | H |
| R | H | L | H |
| R | H | R | H |
| R | H | H | H |
| H | L | L | H |
| H | L | R | H |
| H | L | H | H |
| H | R | L | H |
| H | R | R | H |
| H | R | H | H |
| H | H | L | H |
| H | H | R | H |
| H | H | H | H |

| L | HOT | low |
| R | NOMINAL | reference |
| H | FATAL | high |

Fig. 5
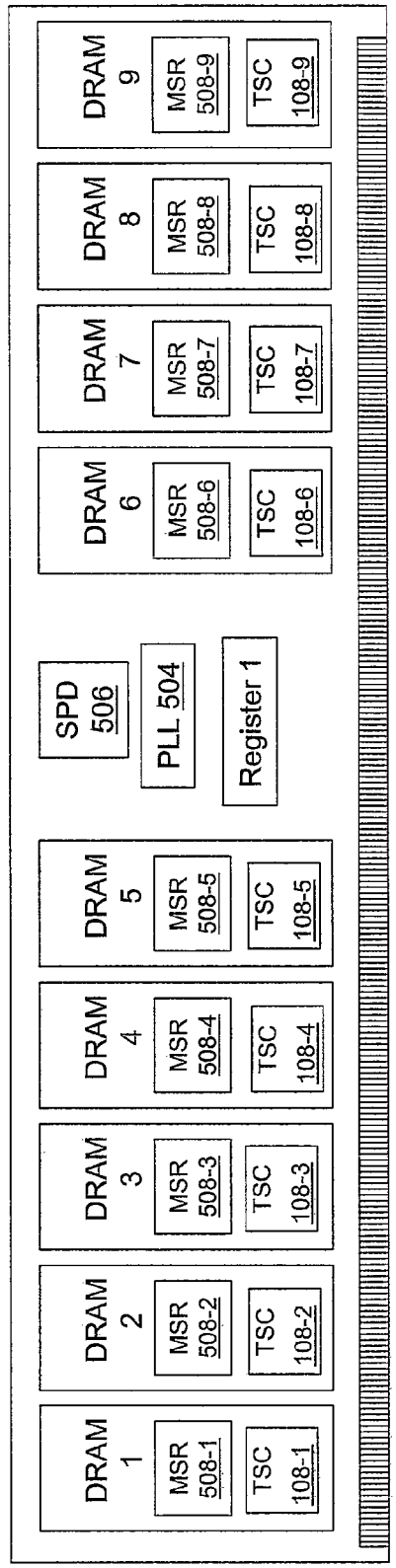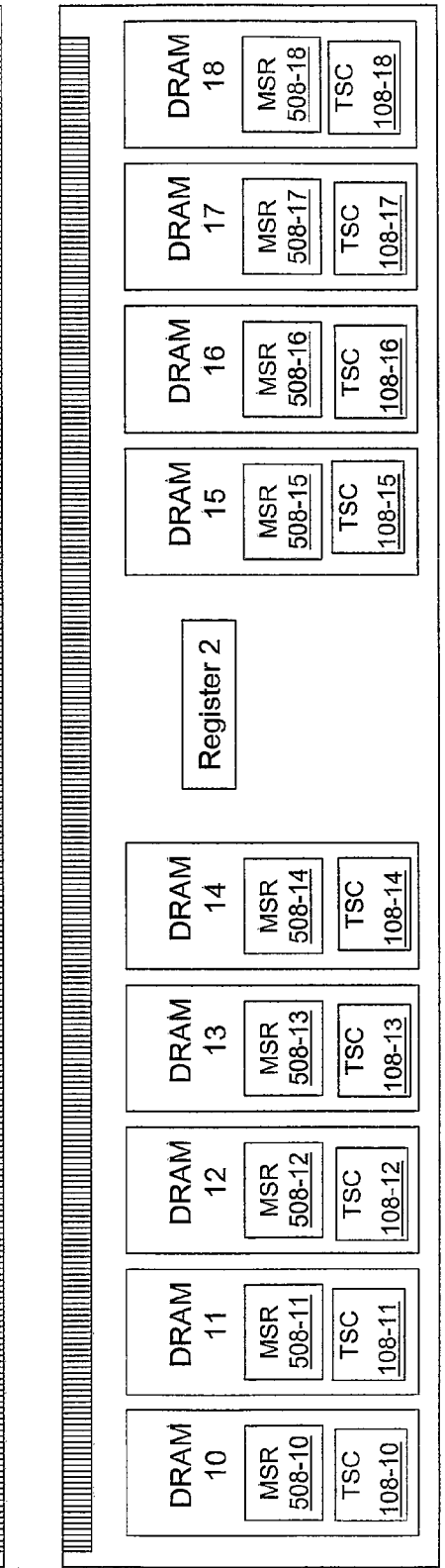

SLAVE MODE THERMAL CONTROL WITH THROTTLING AND SHUTDOWN

PRIORITY CLAIM

The present application is a continuation of U.S. patent application Ser. No. 11/137,157, filed on May 25, 2005, and entitled, "Slave Mode Thermal Control with Throttling and Shutdown," which is incorporated herein by reference.

BACKGROUND OF THE INVENTION

1. Technical Field

The present invention relates in general to the field of integrated circuits, and in particular to integrated circuits that have chains of multiple components. Still more particularly, the present invention relates to a method and system for throttling down, shutting down, or providing additional cooling to one or more of the chains when one or more of the components in the chain becomes too thermally hot.

2. Description of the Related Art

Components in integrated circuits are often heat sensitive. In particular, when a component experiences overuse, such as being imposed upon to handle excessive bandwidth or to perform an excessive number of computations, that component can become overheated to the point of becoming unstable or even damaged.

In the prior art, thermal monitoring of such components has been typically performed at the component level, and thus required a different monitoring circuit for each specific component. When the components are slaves to a master controller, then the master controller must have a different pin allocated to each of the slave components being monitored. Such a situation becomes untenable when hundreds or thousands of slaves are monitored by the master controller.

SUMMARY OF THE INVENTION

To address the limitations of the prior art, a method, system, computer program product and service for throttling, shutting down, or providing additional cooling to a group of components is presented. Each component in the group has a thermal detector that identifies whether that component is operating at a temperature that is normal, high or fatal. A first signal representing a first component's temperature is sent downstream to a second component in the group. If the second component is operating at the first component's temperature or lower, then the first signal is passed on downstream unaltered from the second component. However, if the second component is at a higher temperature, then the second component generates a second signal that represents the second component's temperature, and sends that second signal downstream. A signal representing the highest temperature detected in the components in the group eventually reaches a master controller that, depending on the signal received from the group, either lets the group operate normally, throttles the group down, shuts down the group, or provides additional cooling to the group. Thus, the components in the group are slaves under the thermal control of the master controller, either directly or via an intermediary control circuitry.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed descriptions of an illustrative embodiment when read in conjunction with the accompanying drawings, wherein:

FIGS. 3a-b depict a test circuit for a group of IC's having the TSCs shown in FIG. 1;

FIG. 4a illustrates a truth table for thermal sensor signals into and out of a TSC in a single IC;

FIG. 5 illustrates a Dual In-Line Memory Module (DIMM) that can incorporate the TSCs and testing method presently described;

FIG. 7 depicts an exemplary testing computer system that may be used to test the groups of ICs illustrated in FIG. 1a.

DETAILED DESCRIPTION OF THE PREFERRED EMBODIMENT

Figure 1:
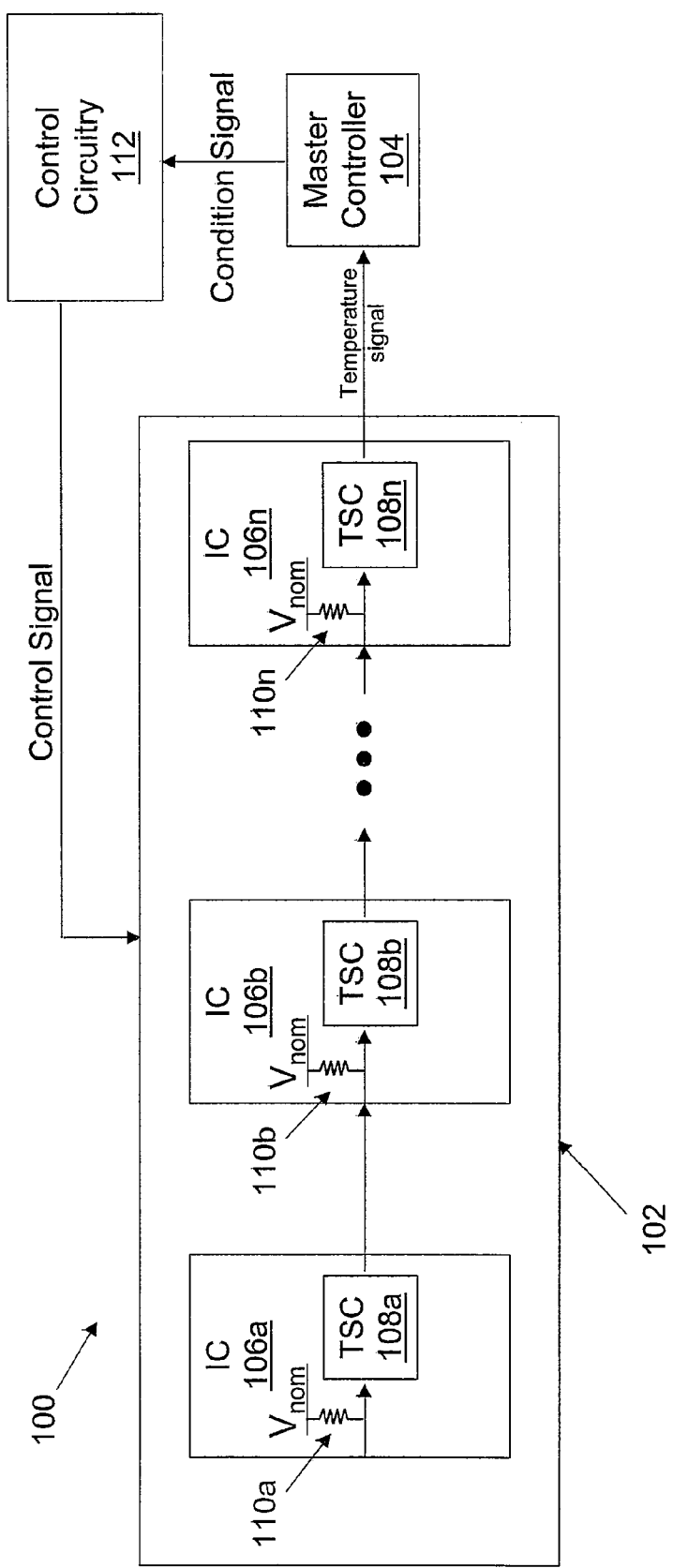
FIG. 1 illustrates an exemplary circuit having multiple Integrated Circuit (IC) components under the control of a master controller.

With reference now to the figures, and in particular to FIG. 1, there is depicted a high-level block diagram of a system 100 in accordance with a preferred embodiment of the present invention. System 100 includes a component group 102, which is made up of multiple electrical components, illustrated for exemplary purposes as Integrated Circuits (ICs) 106a-n. Each IC 106 has associated with it a Thermal Sensor Circuit (TSC) 108, which may be on a same chip or another chip as IC 106. As will be discussed in greater detail below, the first IC 106a in component group 102 has associated with it a pull-up resistor 110 coupled to a nominal mid-range voltage ($V_{nom}$) source. The last IC 106n in component group 102 sends a temperature signal, indicating a highest level temperature detected for any of the ICs 106 in component group 102, to a master controller 104. Responding to the temperature signal received, master controller 104 then sends, directly or indirectly via a condition signal to control circuitry 112, a control signal to component group 102. Depending on the value of the temperature signal received, the control signal either allows component group 102 to continue to operate normally, throttles-down the operation of component group 102, shuts down the operation component group 102, or provides additional cooling to component group 102.

Each TSC 108 has hysteresis functionality that prevents short cycling. That is, if a particular IC 106 gets hot, then the group, in which that particular IC 106 is a part, is throttled long enough for the particular IC 106 to cool down substantially so the particular IC 106 does not oscillate on and off rapidly nor stay close to a hot or fatal temperature too long. While fatal and hot thermal sensors (not shown) in each TSC 108 can reset with hysteresis, alternatively the fatal thermal detectors in each TSC 108 can be latched and reset only with a power down or a group reset of the component group 102.

TSC 108a is able to generate a (logical voltage level) temperature signal that reflects if IC 106a has experienced a nominal, hot or fatal temperature. This temperature signal is then sent downstream to TSC 108b and eventually on to TSC 108n, which sends to a master controller 104 a temperature signal describing the thermally hottest IC 106 in component group 102. Master controller 104 is then able to send a control signal to a control circuitry 112 that is capable of reducing the temperature in component group 102. This control circuitry may be, for example, a controller that throttles down the operations of ICs 106a-n, increases cooling capacity from fans or other cooling devices, or shuts down the operation of component group 102. Note that each component group 102 can be protected by going straight to a shut-down mode if no means for throttling-down or increasing cooling capacity is available.

Note also in FIG. 1 that each IC 106 optionally has an associated pull-up resistor 110 going to a source of $V_{nom}$. The pull-up resistors 110 after 110a are normally not necessary, since they are only required to create a nominal voltage in the first TSC 108 in the daisy-chained series of TSCs 108. However, if a physical break should occur between TSCs 108, then one or more pull-up resistors 110 that are "downstream" (closer to master controller 104) from the break can provide a new initializing $V_{nom}$ to a downstream TSC 108, thus permitting the downstream section to continue to produce a temperature-indicative voltage signal as described above. Note that each or all of the resistors 110a-n may be on a same piece of silicon as the ICs 106 and/or TSCs 108, or alternatively one or more of the shown resistors 110a-n may be off that piece of silicon (chip) having the ICs 106 and/or TSCs 108.

Control circuitry 112 receives a control signal from master controller 104 for processing described in detail below. In brief, this processing performed by control circuitry 112 includes optionally imposing, on one or more component groups 102, normal operation, throttle-down, shut-down, or additional cooling resources.

Figure 2:
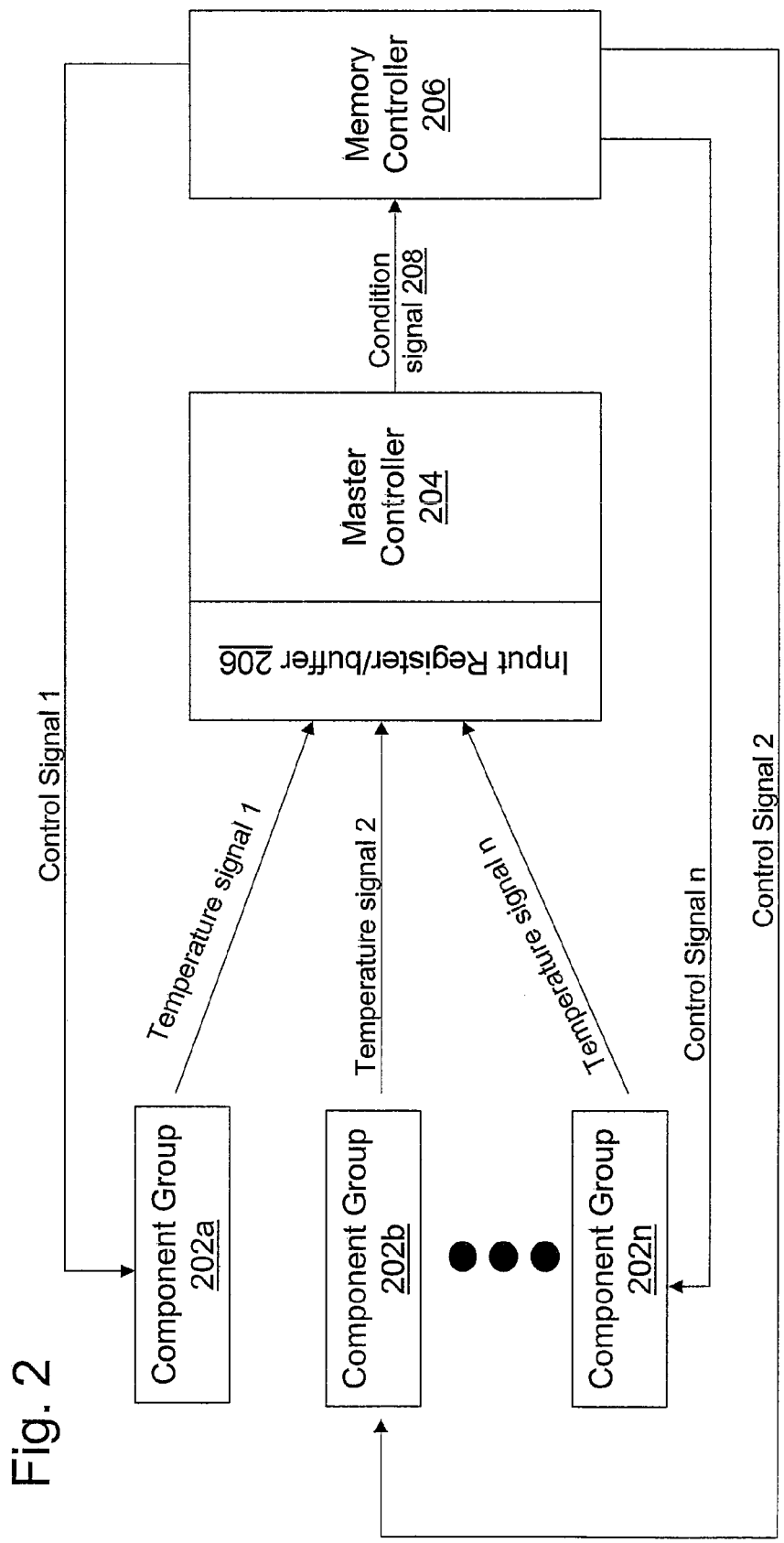
FIG. 2 illustrates multiple groups of IC's under the control of a single master controller.

With reference now to FIG. 2, a block diagram of multiple component groups 202, such as that shown in FIG. 1 as component group 102, may be monitored and controlled by a single master controller 204. Each of the component groups 202a-n sends a temperature signal (shown as respective temperature signals 1-n) to master controller 204. Each temperature signal is generated using the TSCs 108 described above to describe a highest temperature experienced by any IC 106 or similar component within the component group 202.

Optionally, to minimize the number of pins needed by master controller 204, an input register/buffer 206, preferably a single pin serial buffer, may be used to receive each temperature signal from the different component groups 202. As similarly described above, master controller 204 then sends a condition signal 208 describing the temperature conditions of the component groups to a memory controller 206 (which functions as the control circuitry 112 shown in FIG. 1), which sends a control signal to each component group 202, allowing each component group 202 to (independently of other component groups 202) function normally, throttle-down, turn off, or be afforded additional cooling resources. In a preferred embodiment, master controller 204 and memory controller 206 can be incorporated into a single logic. However implemented, master controller 204 and memory controller 206 provide a preferred means for controlling large numbers of component groups 202, either through direct pinning or through cascading master controllers 104.

Note that the condition signal 208 shown in FIG. 2 can represent the output value shown in FIG. 4b below if all groups attached to master controller 204 can be controlled together. Alternatively, the shown condition signal 208 may be multiple signals, with one signal for each component group 202 that can be controlled as a single group. If condition signal 208 is a multiple signal, then condition signal 208 will include information indicating which thermal condition is applicable to which component group 208.

Figure 3B:
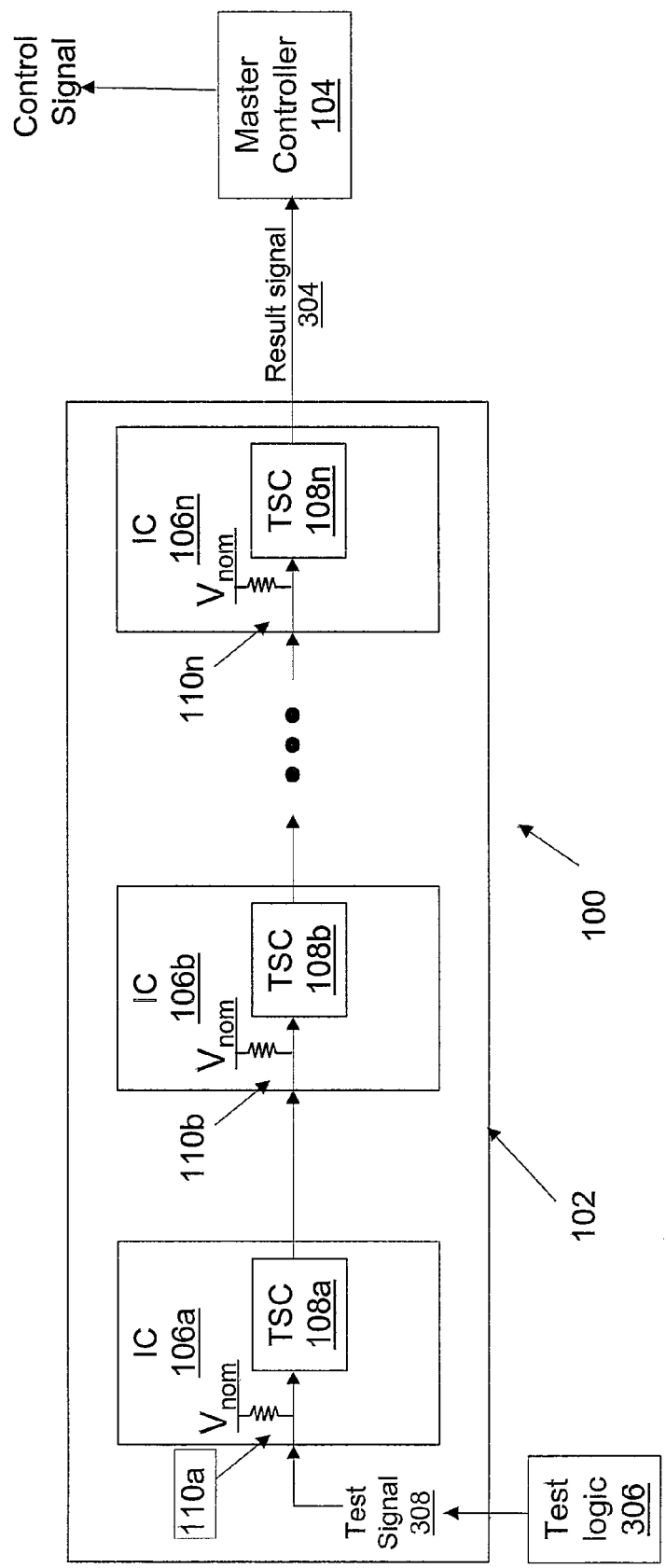

It may be optionally desirable to test the functionality of the TSCs 108 of the ICs 106 within a component group 102. Thus, with reference to FIGS. 3a-b, a high-level block diagram of such a component group 102 under test is shown. A test signal 302, preferably generated by master controller 104 as shown in FIG. 3a, but alternatively produced by another logic (shown in FIG. 3b as test logic 306 capable of producing a test signal 308) upon system restart or upon a command signal, is sent to an input of TSC 108a, which is in the first component (IC 106a) in component group 102. In a preferred embodiment, the test signal 302 is sent after master controller 104 periodically interrupts (pauses) operations in component group 102.

Note that while test logic 306 is shown as being off the same chip as the rest of component group 102, alternatively test logic 306 may be on the same chip (e.g., same piece of silicon) as component group 102.

With reference now to FIG. 4a, a truth table 402 is shown for outputs from a TSC 108. The first column shows inputs into the TSC 108, either from a source for $V_{nom}$ as shown for TSC 108a in FIG. 1, or that being supplied to a downstream TSC 108b from an "upstream" TSC 108a as shown in FIG. 1. The second column shows whether a Fatal signal is generated by the TSC 108 as (H) or not (L), and the third column shows whether a Hot signal is generated by the TSC 108 as present (L) or not (H).

Figure 4B:
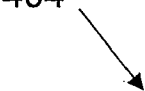
FIG. 4b depicts a truth table for inputs into the single master controller from the multiple groups of IC's shown in FIG. 2.

Similarly, FIG. 4b shows a truth table 404 for temperature signals (Input1,2,3) shown in FIG. 2 being sent to master controller 204, which produces a condition signal 208 (Output) as described above.

An exemplary pseudo code describing the truth tables shown in FIGS. 4a-b is:

[If any input is H (FATAL), then the output is H]

Else [If any input is L(HOT), then the output is L]

Else [The output is R (NOMINAL)].

As understood and known to those skilled in the art of logic, the truth tables generated by TSC's 108 are created using any known thermal logic circuitry, including those circuits that incorporate the use of thermal diodes, thermal resistors, etc.

With reference now to FIG. 5, a Dual In-Line Memory Module (DIMM) 502 is depicted, which may be a component group 102 as described above. That is, each Dynamic Random Access Memory (DRAM) 1-18 may correspond to an IC 106 described above, such that each DRAM has a TSC 108, thus permitting DIMM 502 to be monitored, controlled, and tested as described above. One exemplary method of wiring DIMM 502 would be DRAM1-DRAM5, Register 1, Phase Lock Loop (PLL) 504 (used by DIMM 502 as a zero-delay clock buffer), DRAM6-DRAM 9, and then to the back side of DIMM 502 to pick up DRAM 18-15, Register 2, DRAM14-DRAM 10, and then to an external (not shown in FIG. 5) master controller 104 via connectors 506.

DIMMs 502 can be stacked such that for every DRAM shown in FIG. 5 there is another DRAM (not shown) placed on top of it. This would provide for 36 DRAMs. Furthermore, other DIMMs 502 (not shown) can have more than 18 DRAMs. Preferably, each DIMM 502, no matter how many DRAMs it contains, will be treated as a single component group, such that all of the DRAMs go to the master controller 104 via a single pin.

As with other component groups earlier described, the master controller 104 operates the DIMM 502 such that the master controller 104 throttles down a bus on DIMM 502 if any of the DRAMs are exposed to a "hot" temperature, and the master controller 104 shuts down the DIMM 502 if any of the DRAMs are exposed to a "fatal" temperature. Alternatively, master controller 104 can generate a signal that causes additional cooling capacity, such as by turning on or increasing the speed of a fan 726 shown below in FIG. 7. Within each DIMM 502 is a Serial Presence Detect (SPD) data 506, which provides data to a Basic Input/Output System (BIOS) regarding the operational capabilities of the DIMM 502. In a preferred embodiment of the present invention, data is added to the SPD data 506 describing the DIMM 502 as incorporating the TSC 108 based thermal management as described herein.

In another preferred embodiment, the temperature signals input into the master controller 104 can be read by defining some bits in one of the Machine Status Registers (MSRs) 508 within the DRAMs. Alternatively, registers can be provided and direct or sideband means can be provided to read the temperature signals such as in a special cycle or by a service processor attached to a serial port coupled to the master controller.

Figure 6:
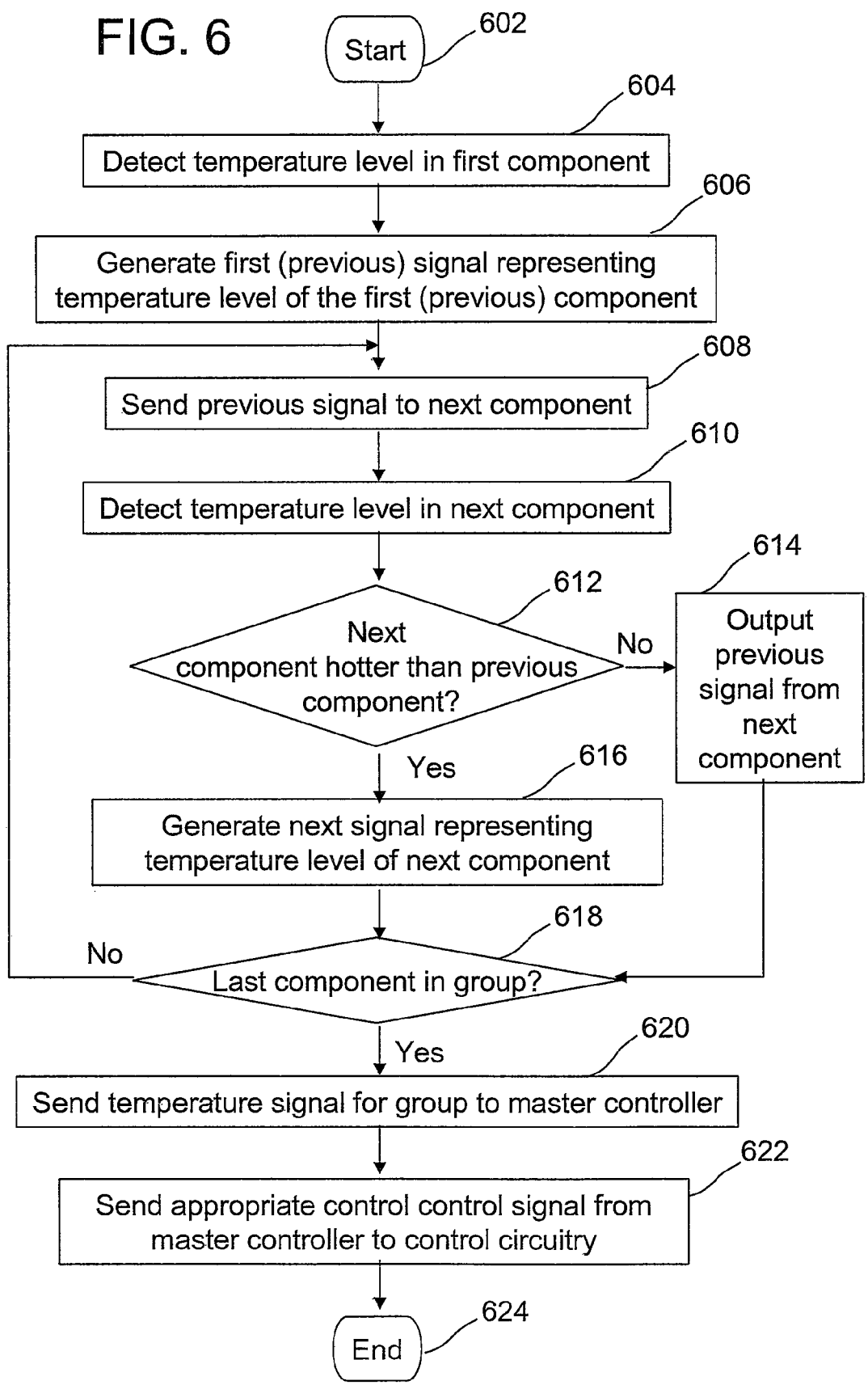
FIG. 6 is a high-level flow-chart showing exemplary steps taken to monitor and control temperatures in ICs.

With reference now to FIG. 6, a high-level flow chart of exemplary steps taken by the present process is depicted. After initiator block 602, a temperature level is detected in a first component in a component group (block 604). A temperature signal representing the temperature of the first component is generated (block 606) and sent to the next component in the component group (block 608).

The temperature of the next component is then detected (block 610). If the next component is no hotter than the previous component (query block 612), then the temperature signal from the previous component is output from the next component (block 614). However, if the temperature of the next component is hotter than the previous component, then a new temperature signal representing the hotter temperature is generated (block 616). The process reiterates until the last component is examined (query block 618). The final temperature signal representing the highest temperature experienced by any of the components is then sent to the master controller (block 620). The master controller (or preferably memory controller) sends an appropriate control signal to the control circuitry that is controlling the component group (block 622), causing the component group to continue to function normally, throttled down, or shut off, or to provide additional cooling to the component group (such as turning on additional local fans, etc.), and the process ends (terminator block 624).

Figure 7:
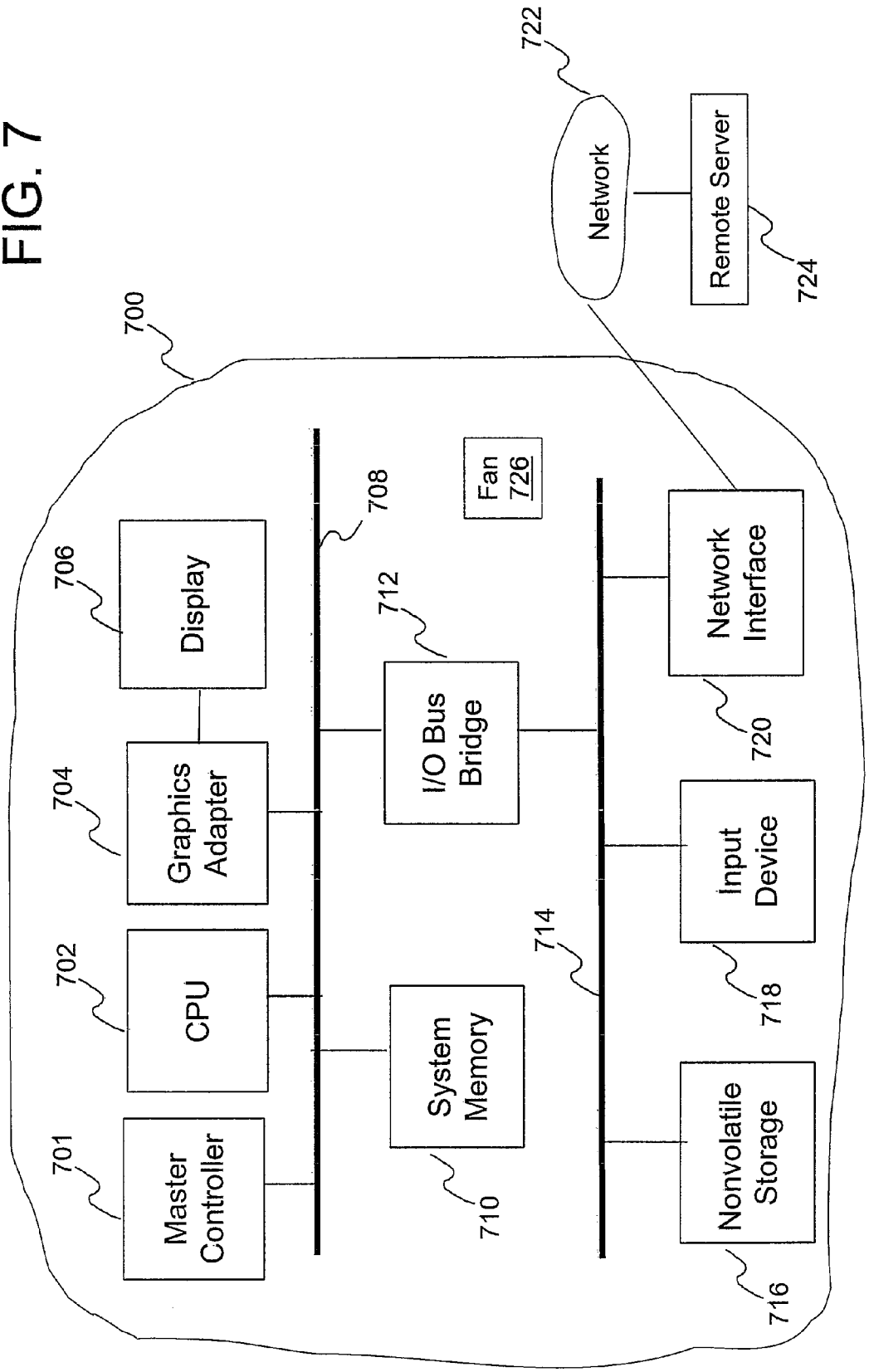

Referring now to FIG. 7, a block diagram of an exemplary data processing system which can be used to perform the detection, control and/or testing described above of a component group is presented as a data processing system 700. For example, the component group may be a system memory 710 as described below, which is tested under the control of a master controller 701 (having analogous functionality as described above for master controller 104/204, memory controller 206, and/or control circuitry 112) shown in FIG. 7. Alternatively, Master Controller 701 may be controlling and/or testing an external component group (not shown) either through a direct coupling or via an Input/Output system described below.

Data processing system 700 includes a central processing unit (CPU) 702, which is connected to a system bus 708. In the exemplary embodiment, data processing system 700 includes a graphics adapter 704 also connected to system bus 708, for providing user interface information to a display 706.

Also connected to system bus 708 are a system memory 710 and an input/output (I/O) bus bridge 712. I/O bus bridge 712 couples an I/O bus 714 to system bus 708, relaying and/or transforming data transactions from one bus to the other. Peripheral devices such as nonvolatile storage 716, which may be a hard disk drive, flash memory, etc., and input device 718, which may include a conventional keyboard, mouse, a trackball, or the like, as well as a bar code or similar reader or a card reader or other similar device, is connected to I/O bus 714. Data processing system 700 will perform the method of the present invention using software, stored in memory system 710 and executed on CPU 702. The construction and use of software structures is well understood by those skilled in the relevant arts.

Data processing system 700 also includes a network interface 720. Network interface 720 is an interface that permits data processing system 700 to communicate, hard-wired or wirelessly with a server 724 via a network 726.

The exemplary embodiment shown in FIG. 7 is provided solely for the purposes of explaining the invention. Those skilled in the art will recognize that numerous variations are possible, both in form and function. For instance, data processing system 700 might also include a compact disk read-only memory (CD-ROM) or digital versatile disk (DVD) drive, a sound card and audio speakers, and numerous other optional components. All such variations are believed to be within the spirit and scope of the present invention.

Figure 8:
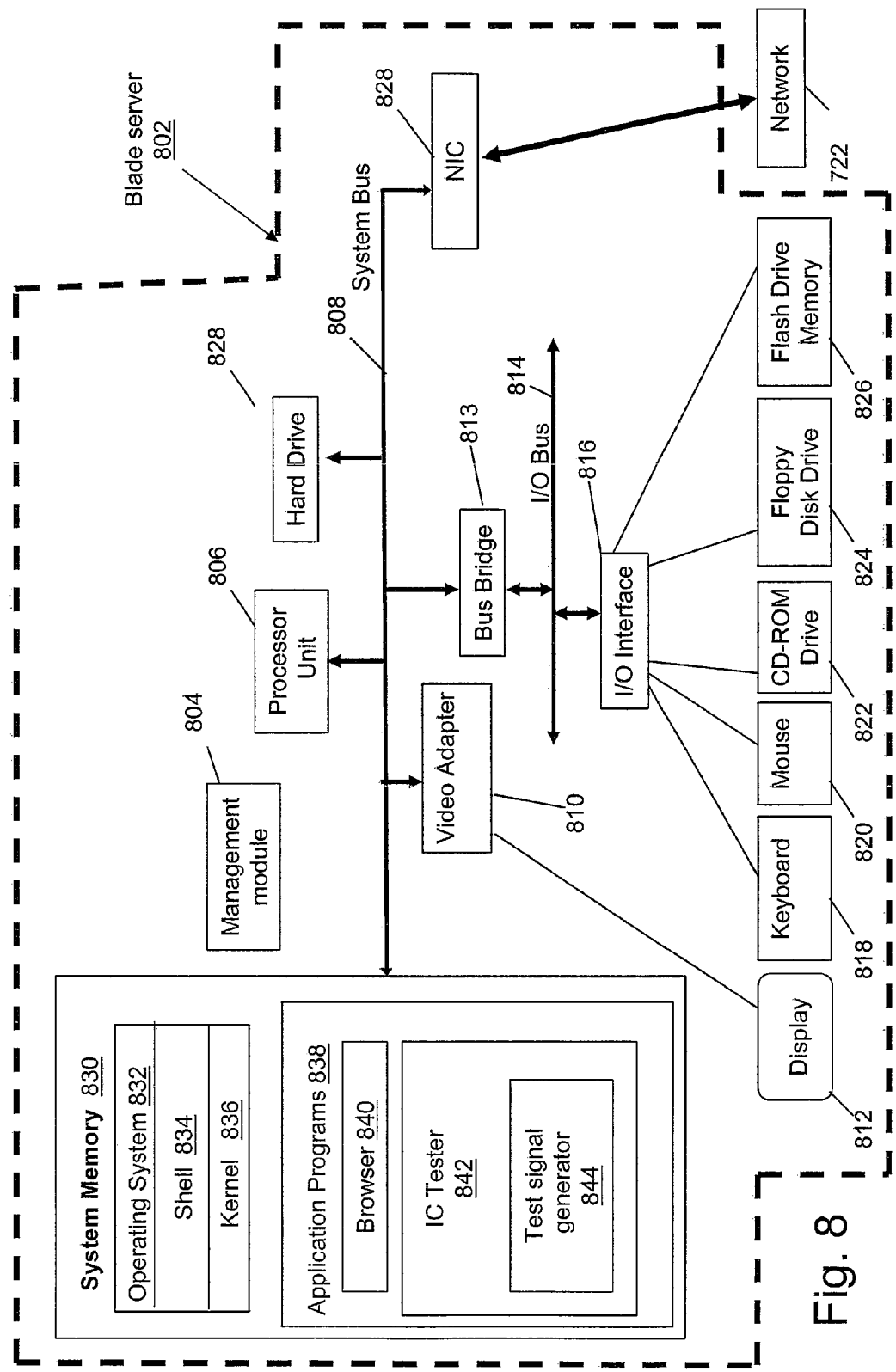
FIG. 8 illustrates an exemplary remote server that may be used to generate and transmit test programs to the exemplary testing computer system of FIG. 7.

With reference now to FIG. 8, there is depicted a block diagram showing additional detail of server 724, which is shown for exemplary purposes as one or more blade servers 802 found in a blade server computer (not shown, but understood to be composed of a chassis holding multiple blade servers, each of which have one or more processors). Blade server 802 includes a management module 804, which permits coordination of operations among other blade servers 802 within the blade server computer.

Blade server 802 also includes a processing module depicted as a processor unit 806, which may be one or more processors operating in harmony, coupled to a system bus 808. Also coupled to system bus 808 is a video adapter 810, which drives/supports a display 812.

System bus 808 is coupled via a bus bridge 813 to an Input/Output (I/O) bus 814. Coupled to I/O bus 814 is an I/O interface 816, which affords communication with various I/O devices, including a keyboard 818, a mouse 820, a Compact Disk—Read Only Memory (CD-ROM) drive 822, a floppy disk drive 824, and a flash drive memory 826. The format of the ports connected to I/O interface 816 may be any known to those skilled in the art of computer architecture, including but not limited to Universal Serial Bus (USB) ports.

Blade server 802 is able to communicate with network 726 via a network interface such as Network Interface Card (NIC) 828, which is coupled to system bus 808. Network 726 may be a Local Area Network (LAN), a Wireless LAN (WLAN), a cellular telephone network, a Wide Area Network (WAN) such as the Internet, or any other similar network, preferably wireless.

Also coupled to system bus 808 is a system memory 830. Data that populates system memory 830 includes blade server 802's operating system 832, which includes a command interpreter program known as a shell 834, which is incorporated in a higher level operating system layer and utilized for providing transparent user access to resources such as application programs 838.

As is well known in the art, a command interpreter or "shell" is generally a program that provides an interpreter and interfaces between the user and the operating system. More specifically, a shell program executes commands that are entered into a command line user interface or from a file. The shell (UNIX) or command processor (Windows) is generally the highest level of the operating system software store hierarchy and serves as a command interpreter. The shell typically provides a system prompt, interprets commands entered by keyboard, mouse, or other user input media, and sends the interpreted command(s) to the appropriate lower levels of the operating system (e.g., a kernel 836) for processing.

Exemplary application programs 838 used in the present invention are a web browser 840 and an IC tester 842. Web browser 338 includes program modules and instructions enabling a World Wide Web (WWW) client (i.e., blade server 802) to send and receive network messages to the Internet using HyperText Transfer Protocol (HTTP) messaging.

IC tester 842 controls the operation of master controller 701 shown in FIG. 7. Using control signal generator 844, blade server 802 is able to provide master controller 701, and/or other similar logic instructions, instructions for generating control signals as described above, based on received temperature signals from the component group(s). Similarly, blade server 802 is able to provide master controller 701, and/or other similar logic, instructions necessary to generate the test signal described above.

Note that the hardware and software elements depicted in blade server 802 are not intended to be exhaustive, but rather are representative to highlight essential components required by the present invention. For instance, blade server 802 may include alternate memory storage devices such as magnetic cassettes, Digital Versatile Disks (DVDs), Bernoulli cartridges, and the like. These and other variations are intended to be within the spirit and scope of the present invention.

While a preferred embodiment of the present invention has been particularly shown as described with reference to a preferred embodiment, it will be understood by those skilled in the art that various changes in form and detail may be made therein without departing from the spirit and scope of the invention. It is also important to note that although the present invention has been described in the context of a fully functional computer system, those skilled in the art will appreciate that the mechanisms of the present invention are capable of being distributed via a computer-readable medium, which contains a program product, which may be in a variety of forms, and that the present invention applies equally regardless of the particular type of signal bearing media utilized to actually carry out the distribution. Examples of computer-readable medium (signal bearing media) include, without limitation, recordable type media such as floppy disks or CD ROMs and transmission type media such as analog or digital communication links.

The present method and system disclosed therefore provides an elegant manner for protecting electrical components from being exposed to excessive heat. While the teachings herein have been particularly shown and described with reference to a preferred embodiment, it will be understood by those skilled in the art that various changes in form and detail may be made therein without departing from the spirit and scope of the invention. For example, while the invention has depicted components being thermally monitored and controlled as distinctly separate units, alternatively such components may be sub-units on a single silicon chip or other medium. In addition, while the control signals have been described primarily for throttling down buses and/or components to allow a component to cool down, such described control signals may be used, in addition to or in the alternative to throttling, to add additional cooling by turning on additional system fans or increasing the speed of presently running fans, such as fan 726 shown in FIG. 7, as described above.

What is claimed is:

1. A machine-readable medium having a plurality of instructions processable by a machine embodied therein, wherein said plurality of instructions, when processed by said machine causes said machine to perform a method comprising:

detecting and identifying a first normal temperature, a first hot temperature, or a first fatal temperature as a first detected temperature of a first component in a circuit;

generating at the first component a first signal representing the first detected temperature of the first component;

transmitting the first signal from the first component to a second component in the circuit;

detecting and identifying a second normal temperature, a second hot temperature, or a second fatal temperature as a second detected temperature of a second component in the circuit;

generating at the second component a second signal representing a highest temperature selected from the first and second detected temperatures; and transmitting the second signal to a master controller.

2. The machine readable medium of claim 1, wherein the method further comprises:

transmitting, from the master controller to the circuit, a signal that:

permits the first and second components to operate normally if the second signal represents a normal temperature in both the first and second components; else throttles the first and second components down if the second signal represents that either the first or second components are thermally hot; else shuts down the first and second components if the second signal represents that either the first or second components are exposed to a fatal temperature.

3. A machine-readable medium having a plurality of instructions processable by a machine embodied therein, wherein said plurality of instructions, when processed by said machine causes said machine to perform a method comprising:

detecting and identifying a first normal temperature, a first hot temperature, or a first fatal temperature as a first detected temperature of a first component in a circuit;

generating at the first component a first signal representing the first detected temperature of the first component;

transmitting the first signal from the first component to a second component in the circuit;

detecting and identifying a second normal temperature, a second hot temperature, or a second fatal temperature as a second detected temperature of a second component in the circuit;

generating at the second component a second signal representing a highest temperature selected from the first and second detected temperatures;

transmitting the second signal to a master controller;

transmitting, from the master controller to the circuit, a signal that:

permits the first and second components to operate normally if the second signal represents a normal temperature in both the first and second components; else throttles the first and second components down if the second signal represents that either the first or second components are thermally hot; and else shuts down the first and second components if the second signal represents that either the first or second components are exposed to a fatal temperature; and
transmitting, from the master controller to the circuit, a test signal that is input to the first component while the circuit is disabled, wherein thermal sensor circuits associated with components in the circuit are all deemed to be properly functioning if the master controller receives back the same unadulterated test signal from a last component is the circuit.

* * * * *